United States Patent
Romans

(10) Patent No.: US 6,564,074 B2
(45) Date of Patent: May 13, 2003

(54) POWER MANAGEMENT METHOD OF AND APPARATUS FOR USE IN A WIRELESS LOCAL AREA NETWORK (LAN)

(75) Inventor: Christopher Gwyn Romans, Clevedon (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/934,568

(22) Filed: Aug. 23, 2001

(65) Prior Publication Data

US 2002/0019215 A1 Feb. 14, 2002

Related U.S. Application Data

(63) Continuation of application No. 09/165,306, filed on Oct. 2, 1998.

(30) Foreign Application Priority Data

Oct. 3, 1998 (GB) .............................................. 9721008

(51) Int. Cl.⁷ ................................................. H04B 7/14
(52) U.S. Cl. ...................... 455/574; 455/465; 455/343; 370/318
(58) Field of Search ................................ 455/462, 465, 455/41, 426, 574, 343; 370/338, 318

(56) References Cited

U.S. PATENT DOCUMENTS

| | | |
|---|---|---|
| 5,371,734 A | 6/1994 | Fischer |
| 5,583,866 A | 12/1996 | Vook et al. |
| 5,584,048 A | 12/1996 | Wieczorek |
| 5,740,366 A | 4/1998 | Mahany |
| 6,018,642 A * | 1/2000 | Adachi ....................... 340/7.33 |
| 6,067,297 A * | 5/2000 | Beach ........................ 370/311 |
| 6,085,114 A | 7/2000 | Gibbons |
| 6,192,230 B1 * | 2/2001 | van Bokhorst et al. ..... 370/311 |

FOREIGN PATENT DOCUMENTS

| | | |
|---|---|---|
| WO | 9006633 | 6/1990 |
| WO | WO 93/18596 | 9/1993 |
| WO | WO 95/29568 | 11/1995 |

OTHER PUBLICATIONS

Sivalingam, K. et al. "Low Power Link and Access Protocols for Wireless Multimedia Networks," Vehicular Technology Conference, 1997, IEEE 47th Phoenix, AZ, 4–7 May 1997, New York, NY.

* cited by examiner

Primary Examiner—Thanh Cong Le
Assistant Examiner—Nick Corsaro

(57) ABSTRACT

In a wireless network containing battery powered stations, one station is designated as a control point (CP). Each of the remaining stations has two operating modes: an active mode in which it receives and transmits messages, and an inactive or sleep mode which incurs reduced power consumption. The Control Point periodically transmits a beacon signal, and each station switches to its active mode to receive at least some of these beacon signals. A beacon signal may indicate that data is available for transmission to a particular station (from another station), in which case that particular station then broadcasts a message to indicate that it is awake and can receive messages. A beacon signal also indicates whether a broadcast period is in progress, and time to elapse until a next possible broadcast period will commence; if the Control Point has previously received and stored any broadcast messages it will re-broadcast them during the next following broadcast period and the remaining stations will react by remaining in active mode for the duration of that period.

12 Claims, 4 Drawing Sheets

B - Beacon
BB - Beacon with the broadcast flag set

POWER MANAGEMENT METHOD OF AND APPARATUS FOR USE IN A WIRELESS LOCAL AREA NETWORK (LAN)

This application is a continuation application Ser. No. 09/165,306 filed Oct. 2, 1998.

FIELD OF THE INVENTION

This invention relates to wireless communications. It provides a method by which data can be delivered to stations that are participating in a wireless network but which are using a power management strategy and therefore are periodically in a low power mode and cannot transmit or receive data.

BACKGROUND

One of the main advantages of a wireless network is that it enables communication between mobile battery powered devices (stations) and also communication between these devices and devices connected to other communications networks. One of the critical factors for such mobile devices is to enable them to operate for a long period of time. In designing such a device a designer aims to reduce the overall power consumption and therefore, increase either the operating time of the device, or reduce the number and size of the batteries required to power the device and thus make the device smaller.

In such a battery powered device each of the subsystems has a particular power requirement. Some of these subsystems have higher power requirements than others and in order to increase the overall operating time of such devices it would be advantageous to be able to switch off some subsystems or operate them in a low power mode until they are required. All wireless devices use power when they transmit or receive data (and in most cases will consume significantly more power in transmit mode than in receive mode). It is therefore very advantageous to minimise the time when such a device has to be fully powered up (in an awake state) to send or receive data and maximise the time when it can be in a powered down state (asleep).

A station which implements power saving functions can be in one of three states:

In Power Saving (PS) mode and awake (or active);

In Power Saving (PS) mode and asleep or inactive;

Non-Power Saving mode.

The invention provides a means by which unicast data messages can be delivered to a station operating in a power saving mode; it also provides a means by which broadcast messages (including multicast messages) can be delivered to a station operating in a power saving mode.

SUMMARY OF THE INVENTION

According to one aspect of this invention there is provided a method of operating a wireless network containing a plurality of stations, one station being designated as a control station and the remaining stations having an active state and an inactive state which incurs lower power consumption than the active state, wherein:

the control station periodically transmits a beacon signal;

each remaining station periodically enters its active state to receive the beacon signal; and if there are data for a remaining station to receive, that station transmits a status signal to indicate to other remaining stations that it is active and able to receive data.

In one embodiment of this first aspect, a station (A) that wants to send data in a unicast message to a station (B) in power saving (PS) mode sends a Power Management Service Request message to a Control Point (CP). The CP transmits a Control Point Beacon (CPB) at regular intervals, in which it includes a wake-up command for the station B in power saving mode. Station B periodically wakes up and receives the CPB. If the CPB contains a wake-up flag for station B then station B broadcasts a Power Management Status message, containing its identity, to indicate that it is awake. When station A receives the Power Management Status message it can start sending data to station B. The PS station goes back to sleep when it has not received or sent any unicast data messages for a specified time, the PowerMgtTimeout period, and the last CPB it received did not have its wake-up flag set.

According to another aspect of this invention there is provided a method of operating a wireless network containing a plurality of stations, one station being designated as a control station and the remaining stations having an active state and an inactive state which incurs lower power consumption than the active state, wherein:

the control station periodically transmits a beacon signal containing a flag value indicating whether a broadcast period is in progress and a count value indicating time to elapse until commencement of a next possible broadcast period;

each remaining station periodically enters its active state to receive the beacon signal;

each remaining station remains in its active state if the broadcast flag value indicates a broadcast period is in progress, and otherwise returns to its inactive state; and the control station stores broadcast messages (including multicast messages) transmitted by any remaining station outside a broadcast period, and broadcasts such stored messages during a subsequent broadcast period.

In one implementation of this second aspect, the CP at regular intervals transmits a CPB in which there is a counter that identifies when a broadcast period will commence. All stations in power saving mode will wake up at the start of this broadcast period to receive the CPB. The CPB also contains a broadcast flag. If the broadcast flag is set the PS stations remain awake and only go back to sleep when they receive a CPB in which the broadcast flag is clear. Stations with broadcast messages to send do not wait until this broadcast period starts, but send them as appropriate. The Control Point receives and stores such broadcast messages which are transmitted outside the broadcast period. If at the start of the broadcast period the CP has any broadcast messages stored, it will set the broadcast flag in the CPB and re-broadcast the stored messages during the broadcast period. The broadcast flag in the CPB remains set until the CP has re-broadcast all the broadcast messages it has stored.

BRIEF DESCRIPTION OF THE DRAWINGS

Methods and apparatus in accordance with the invention will now be described, by way of example, with reference to the accompanying drawings, in which.

DETAILED DESCRIPTION

Figure 1:
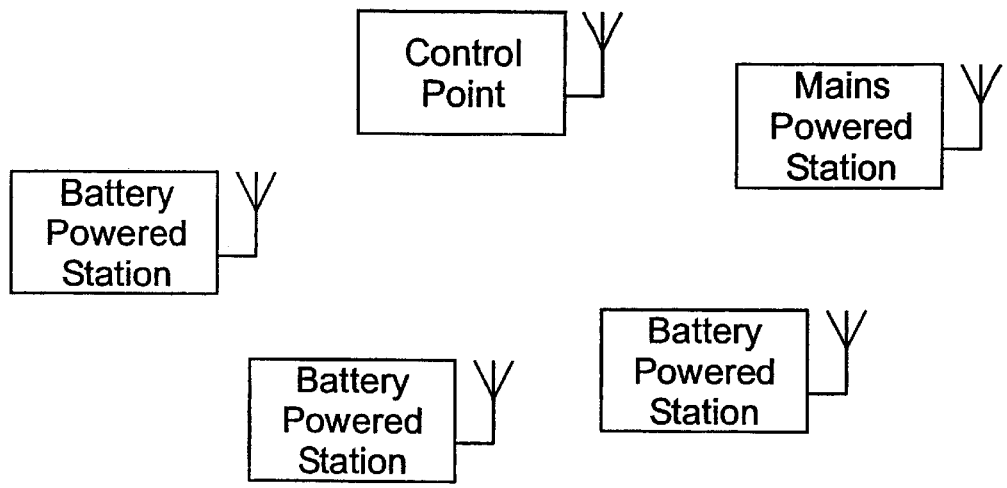
FIG. 1 shows a wireless network system in which the invention could be used.

Referring to FIG. 1, the invention is applicable to a network which consists of a Control Point (CP) and a number of stations which may be battery powered and employ wireless transceivers in order to transmit and receive information. An example of such a network is described in the IEEE 802.11 standard. The Control Point may or may not be connected to another network.

Each station in the network has a identifier or address which is unique within all the stations, including the Control Point, which are participating in the network. The operation of each station is coordinated by, for example, a processor within it operating in accordance with software or firmware instructions stored in associated memory and implementing the steps constituting the power management scheme protocol.

In the scheme described time is divided into a sequence of fixed length periods or frames. In this description these periods are called dwell periods.

For correct operation the power management schemes described herein require the periodic transmission of a Beacon by a Control Point. They do not require each dwell period to be split into a sequence of smaller periods in which the transmission of data is under the control of the Control Point.

Stations using power saving notify the Control Point. If the station switches between the Active and Power Saving modes of operation (or vice-versa) it broadcasts a Power Management Status message, with a flag, the Power Saving Mode flag, set appropriately.

The following sections describe one possible implementation of the control messages required to operate the power management scheme.

Control Point Beacon

The Control Point Beacon (CPB) is broadcast by the CP at the start of every dwell period. The CPB can include a number of sets of information including an optional set of power management information. The power management information is only present if there is at least one station in the network using power management services.

The Power Management information consists of: a length field which is used to determine the number of sets of station information included in the CPB; a broadcast data field; a sequence of station information fields containing the address of an individual station; and an event field for that station which contains a set of control and information flags.

| | | Station 1 | | Station N | |
|---|---|---|---|---|---|
| Length in octets of power management information | Broadcast data field | Station Address | Event Flags | Station Address | Event Flags |

The broadcast data field contains the following fields:

| Bit Position | Description |
|---|---|
| 0–6 | Broadcast countdown counter. Indicates the number of dwell periods before the next |

-continued

| Bit Position | Description |
|---|---|
| | broadcast period. A value of 1 indicates that the next dwell period is the start of the broadcast period. |
| 7 | Broadcast flag - Set if this dwell period is part of the broadcast period. |

The Event Flags field can contain the following flags:

| Flag Name | Description |
|---|---|
| Power Saving Registration Flag | Set: Registration as a PS station was successful. Station can now use PS capabilities. |
| Power Saving Denial Flag | Set: Power Management Service Request message received and PS services denied by the CP but, acknowledges that a Power Management Service End message was received from the station. |
| Wake-up Flag | Set: When it receives the CPB the addressed station should come out of power-save mode, broadcast a Power Management Status message and remain awake. Clear: No action required. |
| Wake-up Request Acceptance Flag | Set: A Power Management Service Request message containing a wake-up request was received from the station and was accepted. |
| Wake-up Request Denial Flag | Set: A Power Management Service Request message containing a wake-up request was received from the station but was rejected. |

Power Management Service Request

The Power Management Service Request message is used by a PS station to request power management services from a Control Point. The message is also used by a station with data to send to a PS station to request the Control Point to wake-up the PS station.

The format of the message is:

| Request Field | Address of requesting station | Address of the PS station Optional |
|---|---|---|

The Request Field contains two flags which identify the services that are being requested from the CP.

| Flag Name | Description |
|---|---|
| Power Management Service Request | Set: Station is requesting Power Management services. The optional field, Address of PS Station, is not used. |
| Wake-up PS Station Request. | Set: Requests the CP to wake-up a PS station. The optional field contains the address of the station to be woken up. |

The Control Point will respond to a Power Management Service Request message in the Control Point Beacon. If a station transmits a Power Management Service Request message and does not receive an acknowledgement in the next Control Point Beacon, it should repeat the Power Management Service Request up to a predetermined number of times or until an acknowledgement is received in the Control Point Beacon.

Power Management Service End

A station that no longer requires power management services sends a Power Management Service End message to the CP. Once this message is transmitted by a station, the station can no longer depend on the CP for power management services. The station must re-register with a CP before using power management service again.

The format of the message is:

| Address of the sending PS station |
|---|

Power Management Status Message

This message is broadcast by a PS station to notify other stations on the network of its current power management state.

The message is also broadcast by a PS station after it has received a Control Point Beacon indicating that it must wake-up from its low power state. In this case the message tells other stations in the network that the station is now awake and can receive unicast data messages.

The format of the message is:

| Address of the PS station | Power Saving Mode flag |
|---|---|

If the power saving mode flag is set it indicates that the station is using power management and also that the station will remain active for at least PowerMgtTimeout seconds after the transmission of the message. If the power saving mode flag is clear it indicates that the station is terminating the use of power management.

Delivery of Unicast Data Messages

Overview

Unicast data messages contain the address of the receiving station and are intended only for the receiving station. Broadcast messages contain a special address and are intended for reception by all stations participating in the network.

Requesting Power Management Support from a Control Point

A station which wishes to operate in power saving mode must be in the Active state and remains in the Active state until it is provided with power management support by a Control Point.

To request power management support from a CP the station sends a Power Management Service Request message to the CP.

The CP will respond to the Power Management Service Request message using the power management section of the CP Beacon, notifying the station whether it can provide power management services.

If the CP can provide power management services the PS station broadcasts a Power Management Status message with the PS Mode flag set to notify all other stations that it is using power saving.

If the CP cannot provide power management services the station has the option of remaining in the Active state or going to sleep and requesting power management services again at a later time.

Terminating Power Management Support from a Control Point

A PS station in PS mode can switch to either the Active state or switch off completely. In both cases the PS station sends a Power Management Service End message to the CP to notify the CP that it no longer requires power management services. The Power Management Service End message should be repeated a predetermined number of times or until a CPB is received acknowledging receipt of the message and termination of the power management services for that station. The PS station at this point broadcasts a Power Management Status message with the PS Mode flag clear to notify other stations that it is no longer using power saving.

Low Power Operation

A PS station may go into low power mode under the following situations:

The station has not sent or received a unicast data message from another station for a period of time greater than PowerMgtTimeout seconds.

After waking up and receiving a CPB in which the station's wake-up flag is not set, and the broadcast flag is clear.

Receiving Unicast DATA Messages

A PS station will wake-up periodically to receive the CP Beacon and will remain awake until it receives a CP Beacon. A PS station does not have to wake-up to receive all the Control Point Beacons; in order to conserve power it may choose to wake-up and receive only one in every n Beacons. The CPB wake-up flag associated with a station in PS mode will remain set for a number m of CPB transmissions.

If the wake-up flag for the station is set in the Beacon, the PS station will remain awake and broadcast a Power Management Status message. This message notifies any station that wishes to communicate with the PS station that the PS station is awake and able to receive messages.

If the CP Beacon does not include a wake-up flag for this station, then the station may immediately go back to low power mode.

The wake-up flag in the CP Beacon is cleared when the CP receives a Power Management Status message from the power saving station.

Sending Unicast DATA Messages to a Power Saving Station

A station with a unicast data message to send to a PS station first checks its own internal tables to determine the time when it last sent a message to, or received a message from, the PS station. If the time elapsed is less than PowerMgtTimeout seconds the station can assume that the PS station is awake and send the unicast data message. If the time elapsed is greater than PowerMgtTimeout seconds, then the station must send a Power Management Service Request to the CP requesting that the target station be awakened, i.e. unicast messages for a PS station are buffered by the sender.

When the recipient of a unicast data message receives the message correctly it transmits an acknowledgement message to the sender. If the sender does not receive an acknowledgement within a specified timeout period the sender retransmits the data message.

The CP will indicate in the CPB whether the request has been accepted and if it was accepted that the CP will wake-up the PS station. If the request is accepted the sender waits for a Power Management Status message from the PS station, and after receiving this message sends the data.

It should be noted that each station has to keep track of which stations are PS stations.

Figure 2:
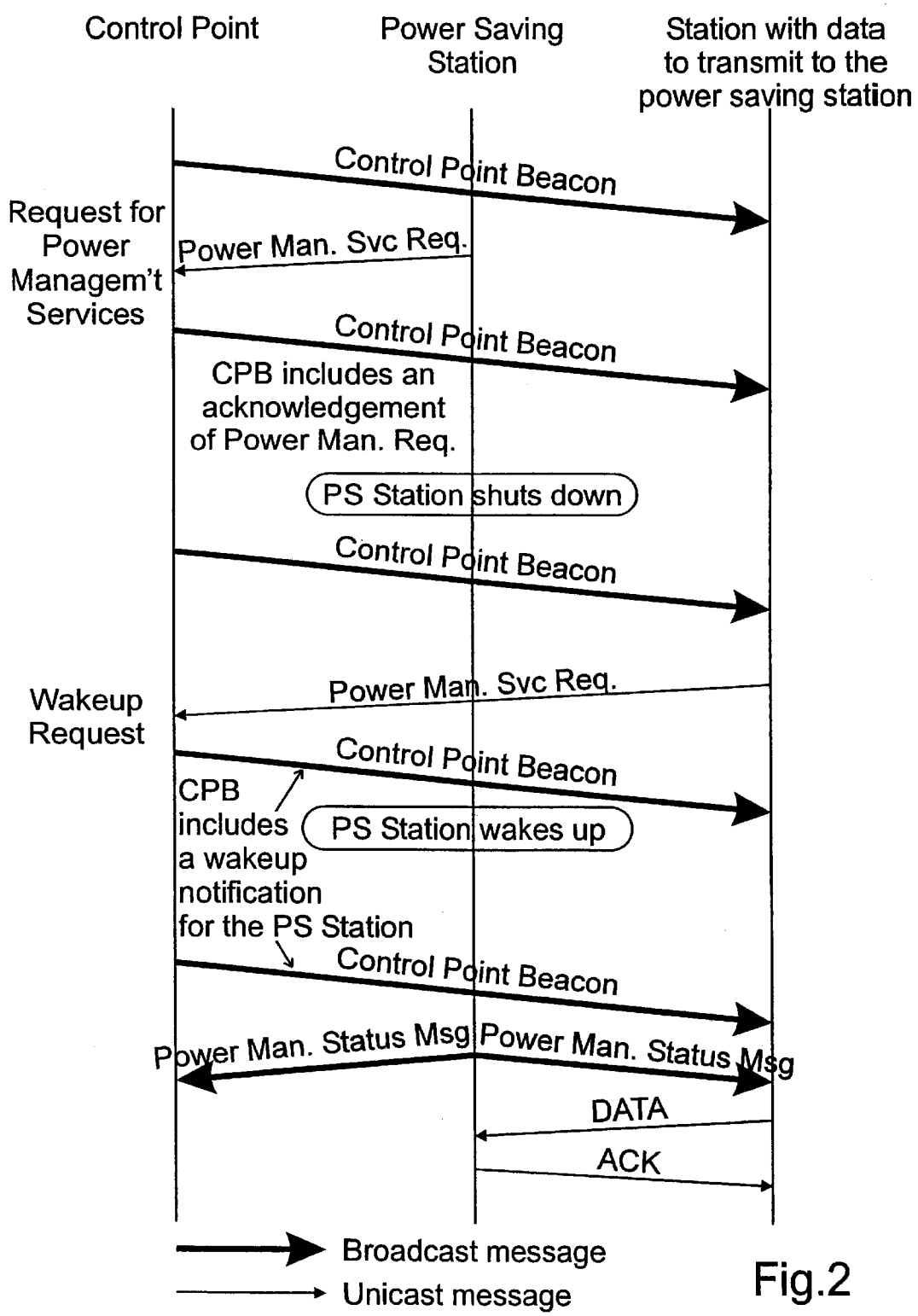
FIG. 2 shows a protocol for transmitting unicast data to a power saving station.

The protocol described above for transmitting Unicast data is summarized in FIG. 2. It has the advantage that a PS station can reduce its power consumption since it only needs to be awake periodically to receive the Control Point Beacons. Once the station is awake it broadcasts a Power Management Status message which notifies all stations that it is awake; it can then exchange data directly with one or more stations without requiring the data messages to be buffered and retransmitted by the Control Point, giving efficient utilisation of the scarce resource constituted by the wireless medium.

Delivery of Broadcast Data Messages

The Control Point is responsible for delivering broadcast messages to PS stations during the broadcast period. No extra functionality is required in other stations (except PS Stations) to support broadcast or multicast messages. Since all multicast messages are also sent to the broadcast address the remainder of this section and subsequent sections will refer to broadcast data messages only.

The broadcast period is at least one dwell period and may be several dwell periods depending on the number of broadcast messages to be transmitted.

Figure 3:
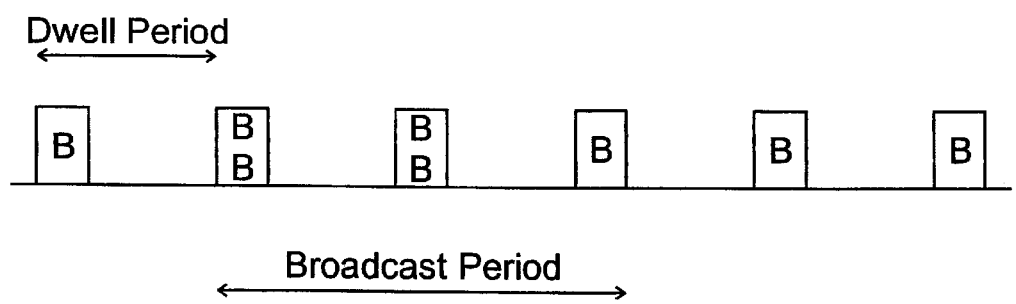
FIG. 3 is a timing diagram showing a broadcast period in relation to a dwell period.

The broadcast period is effective when the broadcast flag in the CP Beacon is set—see FIG. 3.

Control Point Operation

When there are PS stations present in the network the CP will capture and buffer all broadcast messages including those it generates itself and retransmit them during the broadcast period.

The Control Point Beacon includes a broadcast countdown counter which defines the number of dwell periods to the next broadcast period. The broadcast countdown counter is decremented by one before sending the CPB. A countdown value of one indicates that the next dwell period is the start of a broadcast period. Before sending the first beacon to be transmitted in the broadcast period the CP will (re)set the broadcast countdown counter to identify the start of the next broadcast period.

If the CP has any messages to broadcast then it will set the broadcast flag in the CPB transmitted at the start of each dwell period in the broadcast period. The broadcast period ends when the CP transmits a beacon in which the broadcast flag is not set.

The CP will transmit any buffered broadcast messages in the dwell period using an appropriate medium access control mechanism. If at the end of the dwell period the CP has not broadcast all the messages it has stored then it will extend the broadcast period by setting the broadcast flag in the CPB transmitted at the start of the next dwell period.

Any broadcast messages received by the Control Point during a broadcast period (i.e. in a dwell period in which the broadcast flag in the CPB is set) do not need to be buffered and retransmitted by the Control Point since all stations are awake at this point and able to receive the broadcast messages.

The CP determines the length of the broadcast period and the time to the next broadcast period depending on the number of broadcast messages on the network.

Receiving Broadcast Messages

To receive broadcast messages a PS station should notify the Control Point that it is going to be using power management (see section on Requesting Power Management Support from a Control Point) and then remain awake until it receives a Control Point Beacon containing the broadcast countdown counter. From the countdown counter the station can then determine the start of the broadcast period and go into sleep mode until immediately before the start of the broadcast period when it will wake-up to receive the CPB at the start of the broadcast period.

If a PS station receives a CPB in which the broadcast flag is set it should remain awake to receive broadcast messages. The PS station should remain awake until it receives a CPB in which the broadcast flag is not set.

If a PS station receives a CPB in which the broadcast flag is not set it can immediately go to sleep until the start of the next broadcast period.

If a PS station has woken up for the broadcast period and does not receive a CPB, then it should remain awake until it receives a CP Beacon, at which point it can determine whether it should remain awake or go back to sleep.

Figure 4:
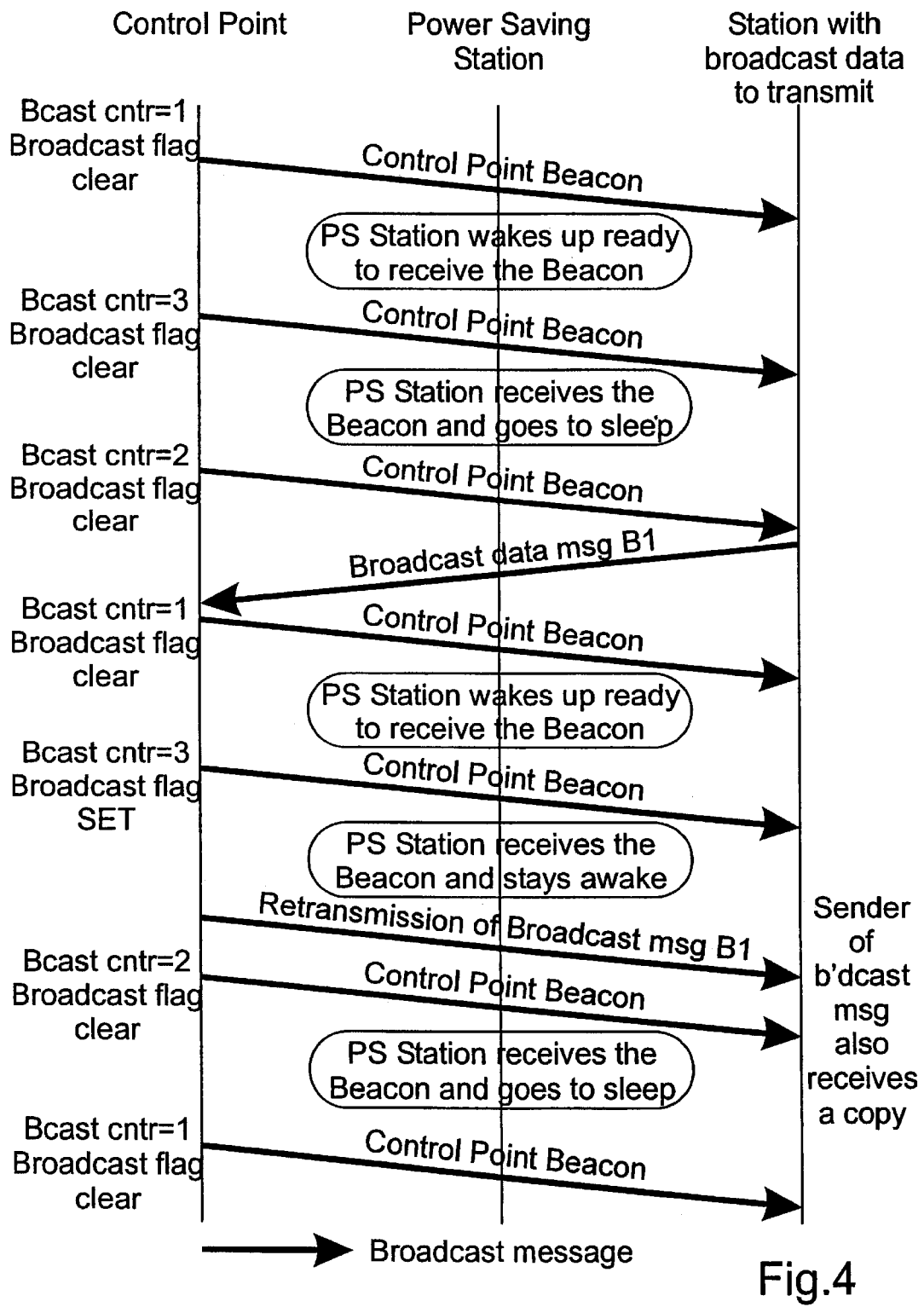
FIG. 4 shows a protocol for receiving broadcast messages.

The protocol described above for receiving broadcast messages is summarized in FIG. 4 (Bcast cntr=broadcast countdown counter). It has the advantage that PS Stations only need to be awake during the broadcast period, enabling them to save power. The broadcast period is longer than the time required for the Control Point to send its buffered messages; during this period any station can send broadcast messages and there is no need for the Control Point to buffer and re-send those messages, improving utilisation of the wireless medium.

Figure 5:
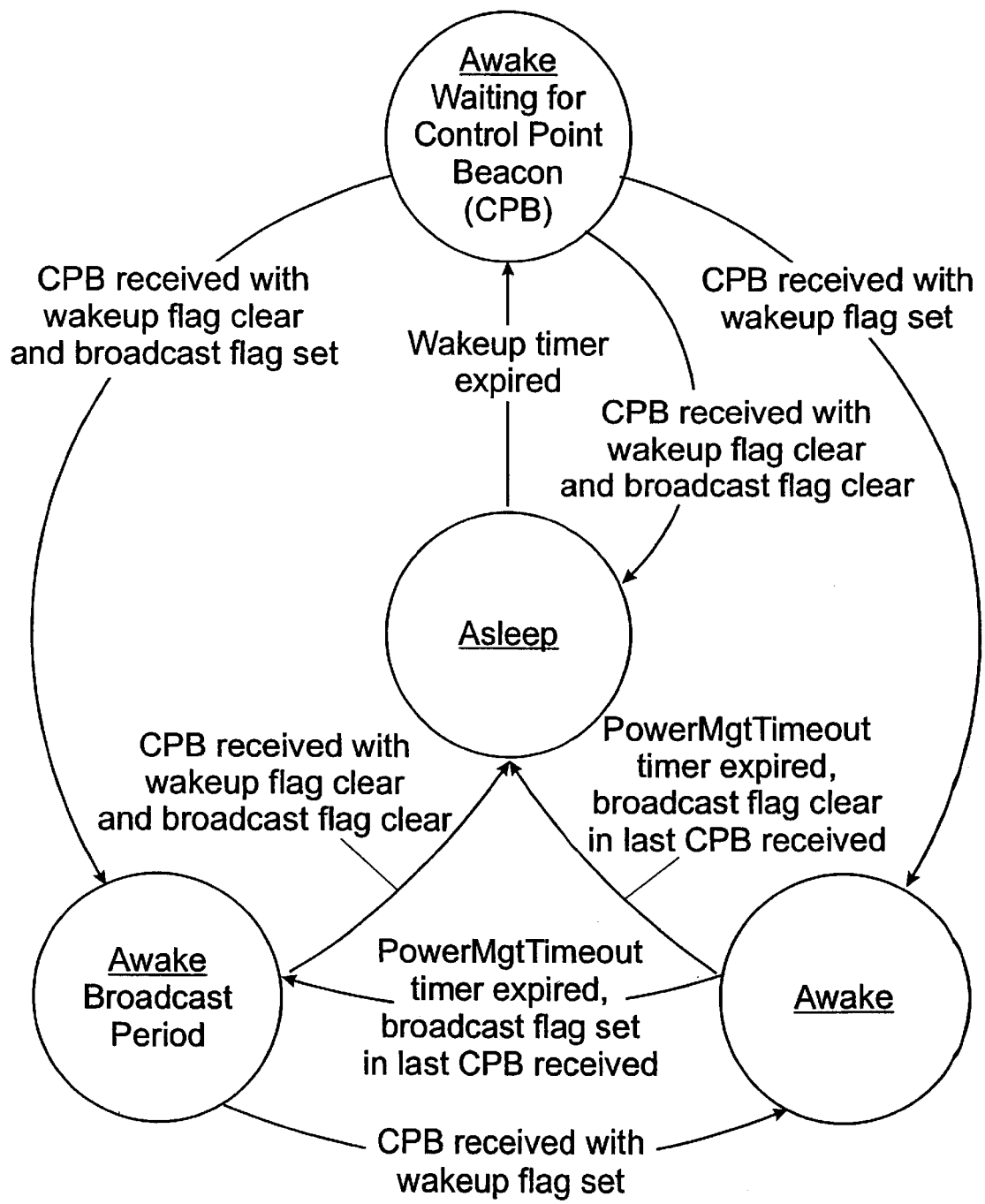
FIG. 5 is a state transition diagram for a power saving station in the network.

FIG. 5 is a state transition diagram summarising the operation of a power saving station to receive unicast and broadcast messages as described above.

What is claimed is:

1. A method of operating a wireless network including a plurality of stations, one station being designated as a control station and the remaining stations having an active state and an inactive state which incurs lower power consumption than the active state, the remaining stations being able to transmit and receive data directly to and from each other, wherein:

the control station periodically transmits a beacon signal;

each remaining station periodically enters its active state to receive the beacon signal; and if there are data for a particular remaining station to receive, that particular remaining station transmits a status signal to indicate to other remaining stations that the particular remaining station is active and able to receive data directly from the other remaining stations.

2. The method of claim 1, wherein the control station incorporates into its beacon signal an indication of the identity of each remaining station for which there are data to be received by that station.

3. The method of claim 1, wherein each remaining station returns to its inactive state if it has not received or transmitted any data during an interval of predetermined duration.

4. The method of claim 1, wherein each remaining station periodically enters its active state to receive every beacon signal.

5. A method of operating a wireless network as claimed in claim 1, further including preventing the remaining stations from sending and receiving messages while in the inactive state.

6. The method of claim 2 further including sending data directly from the sending remaining station to the receiving remaining station when the receiving remaining station is in the active state.

7. A method of operating a wireless network including a plurality of stations, one station being designated as a control station and the remaining stations having an active state and an inactive state which incurs lower power consumption than the active state, wherein:

the control station periodically transmits a beacon signal containing a flag value indicating whether a broadcast period is in progress and a count value indicating time to elapse until commencement of the next possible broadcast period, the broadcast period being longer than the interval between the beacon signals;

each remaining station periodically enters its active state to receive the beacon signal;

each remaining station remains in its active state if the broadcast flag value indicates a broadcast period is in progress, and otherwise returns to its inactive state; and the control station stores broadcast messages transmitted by any remaining station outside a broadcast period, and broadcasts such stored messages during a subsequent broadcast period.

8. The method of claim 7, wherein each remaining station periodically enters its active state to receive every beacon signal.

9. A method of operating a wireless network as claimed in claim 7, further including activating one of the remaining stations so it communicates directly with another remaining station without routing such communication through the control station while both said remaining stations are in the active state.

10. A method of operating a wireless network as claimed in claim 7, further including preventing the remaining stations from sending and receiving messages while in the inactive state.

11. The method of claim 7 wherein the remaining stations are able to transmit and receive data directly to and from each other if there are data for a particular remaining station to receive, the particular remaining station transmitting a status signal to indicate to other remaining stations that the particular remaining station is active and able to receive data directly from the other remaining stations.

12. A method of operating a wireless network containing a plurality of stations, one station being designated as a control station and the remaining stations having an active state and an inactive state which incurs lower power consumption than the active state, the method comprising:

periodically transmitting a beacon signal from the control station;

causing each remaining station to periodically enter its active state to receive the beacon signal;

if there are data for a particular remaining station to receive, causing that particular remaining station to transmit a status signal to indicate to other remaining stations that the particular remaining station is active and able to receive data, the remaining stations having a first power mode in which they are fully in the active state and a second power mode in which they enter the active state only at predetermined times and remain in the active state under specified conditions and are otherwise in the inactive state;

activating the remaining stations so they enter the active state only to receive the beacon signal while the remaining stations are in the second power mode; and activating a remaining station to the first power mode to receive a message in response to that remaining station receiving a beacon signal indicating there is a message to receive.

\* \* \* \* \*